April 17, 1934.  A. HOFFMANN  1,954,998
GYROSCOPIC INCLINOMETER FOR AIRCRAFT
Filed March 6, 1930
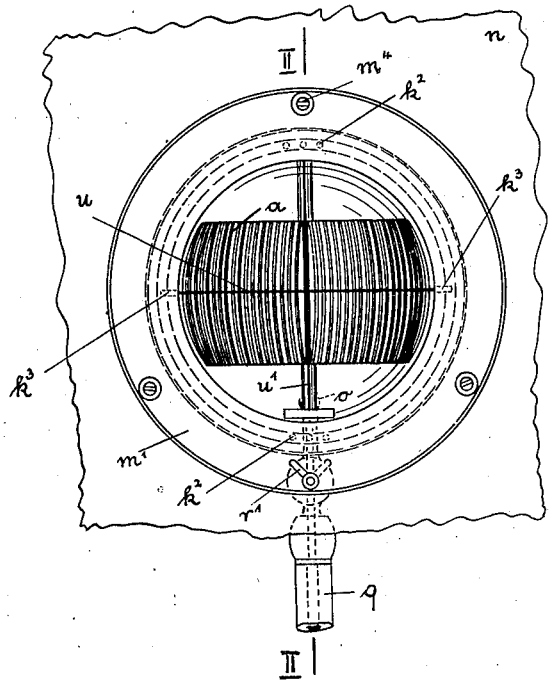
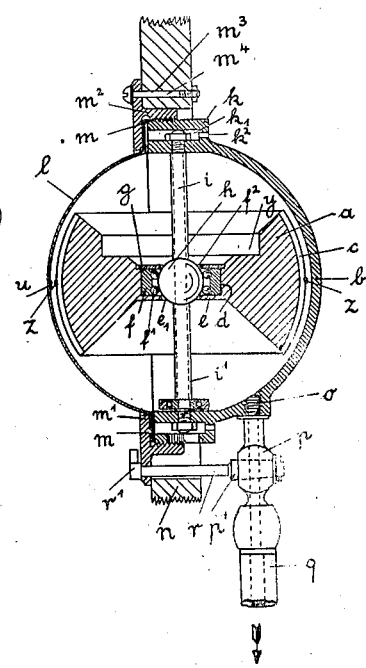
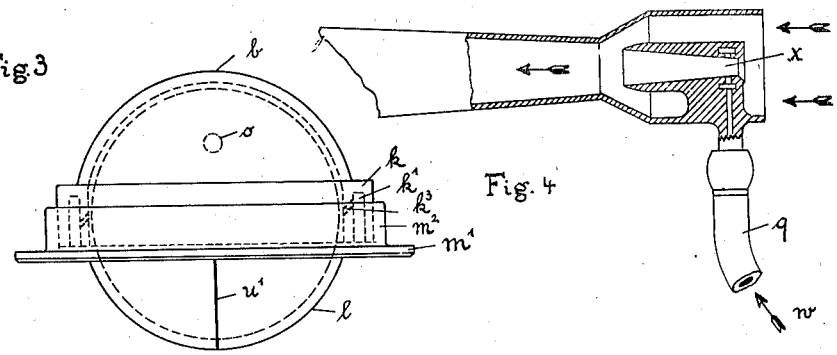
Inventor
August Hoffmann Patented Apr. 17, 1934

1,954,998

UNITED STATES PATENT OFFICE 1,954,998

GYROSCOPIC INCLINOMETER FOR AIRCRAFT

August Hoffmann, Eisenach, Germany

Application March 6, 1930, Serial No. 433,769
In Germany March 7, 1929

5 Claims. (Cl. 33—204)

The present invention relates to an instrument for measuring and indicating the tilt or angle of inclination of aircraft, and more particularly airplanes.

It is the primary object of the invention to provide an instrument of this kind as simple as possible in construction but at the same time functioning in exact and perfectly reliable manner.

Other objects and advantages obtained will become apparent as the description proceeds.

In the instrument according to the invention there is provided a gyrorotor, which is so mounted on a globular or ball member that the gyrorotor is capable of rotating with the greatest ease about the ball member in every relative position of the ball and gyrorotor, and the gyrorotor retaining its normal horizontal position in all inclined positions of the aircraft. The ball member is capable of being moved in all directions relative to the gyrorotor, while the latter continues to rotate in the horizontal plane. The gyrorotor is surrounded by a partly transparent casing, and is furnished with means for visibly indicating the position thereof in relation to the said casing. The casing is mounted in fixed position on the aircraft and accordingly participates in all movements thereof, while the gyrorotor within the casing assumes its horizontal position irrespective of these movements.

By reason of the indicating device it is possible when the aircraft, and accordingly the instrument casing, varies its position to read off the nature and degree of inclination between gyrorotor and casing, and thus ascertain the particular tilt of the air craft.

The invention will now be described more fully with reference to the accompanying drawing, in which Fig. 1 is a front elevation of the instrument, Fig. 2 is a vertical section taken on the line II—II in Fig. 1, Fig. 3 is a view looking from above, and Fig. 4 is a sectional view of an auxiliary apparatus, which will be described later, for operating the instrument.

Referring now to the drawing, the instrument comprises in substance a gyrorotor $a$ and a casing $b$, $l$. This casing consists of two parts, of which the one part $b$ is made of metal, while the second part $l$ is composed of a transparent material, for example glass. The two parts form together a casing having a globular chamber therein. The part $l$ is of calotte form and furnished with an annular flange $m$, while the part $b$ constitutes somewhat more than half of the complete globe. The portion $b$ is of increased thickness about its opening, as at $k$, and in this thickened portion there is arranged an annular recess $k^1$, which is open towards the edge of the casing $b$. The annular flange $m$ of the part $l$ rests against the thickened edge $k$ of the casing section $b$, and if desired a sealing ring or washer may be interposed between the edge $k$ and flange $m$. The portion $l$ is secured to the portion $b$ by a ring $m^1$ arranged with a cylindrical flange M2 intermediate the marginal portions which is screw threaded on the inner surface for threaded connection with corresponding external screw threads on the thickened portion $k$ of the casing section $b$, with the inner marginal portion of the ring engaging over the flange $m^1$ and closing the opening to recess $k^1$ arranging the same as a closed passage and also serving to clamp the flange $m^1$ of the casing section $b$ in secure and airtight connection with the flange portion $k$ of casing section $b$. The outer marginal portion of the ring extends beyond the casing $b$, and is provided with three holes $m^3$ for the passage of threaded bolts $m^4$, threaded into a fixed part of the aircraft, such as the instrument board $n$, to mount the instrument in vertical position.

The thickened portion $k$ has two series of apertures $k^2$ with three apertures in each series arranged at diametrically opposite points through which air is adapted to flow into the passage $k^1$. Disposed diametrically opposite and at an angle of approximately 90° to the inlet openings $k^2$ there are provided inclinedly in the wall of the casing $b$ two jet-like openings $k^3$ in the equatorial plane of the gyrorotor, which connect the passage $k^1$ with the space within the globular chamber formed by the parts $b$ and $l$. The openings $k^3$ are disposed at the same angles and extend in the same direction.

At an appropriate point of the casing $b$ there is provided a hole $o$, into which there is screwed the socket of a cock $p$. This cock communicates by means of a pipe or tube $q$ with a vacuum producing means (Fig. 4). The plug $p^1$ of the cock $p$ is provided with a rod $r$, which is extended through the wall $n$ and the ring $m^1$ and is furnished on the front side of the ring $m^1$ with a small hand lever $r^1$ to manipulate the cock $p$ to an opened or a closed position. In Fig. 1 the two extreme positions of the lever $r^1$ are shown, in which the cock is either open or closed.

The gyrorotor consists, generally speaking, of a globose zone $a$ having a diameter slightly less than the diameter of the chamber in the casing formed by cutting out two oppositely disposed globe sectors of equal size, the edge planes being situated at the same distance from the centre point of the globe from which the zone, or in other words, the truncated globe section forming the gyrorotor, is formed. Expressed in more precise terms the gyrorotor consists of a ring having a spherical outer periphery of sector-like cross-section. A certain amount of material is removed from the upper half of the gyrorotor, as at $y$, so that the centre of gravity is situated somewhat lower than the actual middle point of the gyrorotor. Attention, however, must be paid to the fact that the centre of gravity coincides with the longitudinal centre axis. Disposed about the periphery the gyrorotor $a$ are ribs $c$ forming pockets or vanes extending in meridian lines. The gyrotor consists of suitable material, and requires to be constructed with great exactitude.

At the centre of the zone of the gyrorotor $a$ there is provided in the axial direction a cylindrical recess $d$ having a thin bottom wall $e$. This bottom wall $e$ is provided concentrically of the globose zone with an aperture $e^1$, through which is passed a rod $i$. The rod or stem $i$, disposed vertically within the casing $b$, is so secured at diametrically opposite points that the axis thereof coincides with the vertical centre axis of the spherical space of the casing $b$, $l$. A ball $h$ has a central bore for the passage of the rod $i$, the ball being positioned on the rod $i$ by means of spacing sleeves $i^1$ so that the centre point thereof coincides with the centre point of the spherical space of the casing $b$, $l$. The ball $h$ is mounted in a ball bearing in a ring $f$ secured in the recess $d$ of the gyrorotor with the mass center of the gyrorotor coincident with the center of the ball. The balls $f^1$ of the said bearing run in two annular channels in the ring $f$, and are in contact with the ball $h$. The ball bearing $f$, $f^1$ is held in the recess $d$ by means of a disc $g$, which is screwed into the said recess and has a central hole $f^2$ through which a peripheral portion of the ball projects. This hole is of such size that the bearing together with the gyrorotor $a$ is capable of oscillating about the ball $h$ in any direction. The movement is limited by the rod $i$, or by the ball spacing sleeve $i^1$ respectively. The bearing $f$, $f^1$ is situated within the gyrorotor $a$ in such manner that the centre point thereof coincides with that of the globose zone and that of the ball $h$.

Fig. 4 shows a device with which the pipe or tube $q$ may be connected and which serves the purpose of creating the vacuum above referred to. This device does not constitute part of the invention per se, and is shown merely by way of example for the purpose of illustrating the invention in complete form.

The device in question is nothing other than a Venturi tube, and consists substantially of a tube or pipe in which, upon the forward motion of the aircraft through the air, a strong vacuum is caused at the point $x$ by reason of the suction of the air. This vacuum in the known manner exerts a strong suction action in the direction of the arrow $w$, and this suction produces the necessary vacuum in the hollow globe $b$, $l$.

The instrument is mounted at a point of the machine so as to be readily visible to the pilot, for example on the instrument board $n$, and the cock $p$ is connected in the manner indicated by means of the pipe $q$ with the vacuum creating device according to Fig. 4. Immediately the aircraft commences to move a sucking action is effected by the device shown in Fig. 4, and the air is sucked out of the casing $b$, $l$ and creating a vacuum therein. During the flight of the aircraft a vacuum accordingly is maintained in the casing $b$, $l$ for such length of time as the cock $p$ may be open. By reason of the vacuum caused in the casing $b$, $l$ air is created to enter therein from the passage $k^1$ through the jets $k^3$. The currents of air delivered from the jets $k^3$ strike against the ribs $c$ of the gyrorotor $a$, thus setting the latter into rapid rotation. Owing to the arrangement of the jets $k^3$ the currents of air are directed in the same direction and are passed along the inner wall of the casing $b$, $l$, with the result that the air impinges against the ribs $c$ in every position of the gyrorotor, so that rotation of the gyroscope about the ball $h$ is assured in every relative position of these two parts. Since the suction effect in the pipe $q$ is a very considerable one, the air also passes from the jets $k^3$ at a high speed and pressure. The gyrorotor is thus rotated at a speed of at least 5,000 revolutions per minute.

Along the equator line of the gyrorotor $a$ there is provided an indicator or hair line $z$, which is preferably colored. Similar indicator lines $u$ and $u^1$ are also provided along the equator and meridian lines of the casing portion $l$, these also preferably being colored. The indicator lines in question are shown in somewhat exaggerated form in dotted lines in Fig. 2.

If the aircraft to which the instrument is fitted is flying in a perfectly horizontal position, the wall or instrument board $n$ will be vertical, and the instrument will thus assume the position shown in Fig. 2. The gyrorotor $a$ by reason of the currents of air above referred to will be caused to rotate with great rapidity in a horizontal plane, and since in exactly horizontal position of the aircraft the casing $b$, $l$ assumes the position according to Fig. 2, the hair line $z$ will exactly coincide with the corresponding marking $u$ on the casing portion $l$.

Immediately, however, the aircraft tilts in the one or other direction the casing $b$, $l$ will assure the same position, while the gyrorotor $a$, by reason of its high speed of rotation and the disposal of its centre of gravity at a slightly lower point, retains the horizontal position. Owing to the method of mounting the gyrorotor $a$ on the ball $h$ by means of the ball bearing $f$, $f^1$, the ball $h$ is adapted to adjust itself with the greatest ease in the bearing $f$, $f^1$ of the gyrorotor without any tendency of the latter being in any way moved out of its horizontal position. Upon movement of the casing $b$, $l$ corresponding to any equivalent movement made by the aircraft, the angle of inclination of the latter may be readily determined by the position of the indicator lines $u$, $u^1$ in relation to the indicator line $z$, which always remains in the horizontal position. The pilot is accordingly able to ascertain from the angle of inclination formed between the indicator lines $u$, $u^1$ and the indicator line $z$ retaining the horizontal position in whatever direction the aircraft is tilted either longitudinally or transversely, and how great the angle of inclination actually is.

In Fig. 1 the gyrorotor $a$ and its associated parts have been shown in full lines for the purpose of distinctness, although the same are covered by the transparent casing portion $l$.

The balls $f^1$ are arranged in two rows, each of which forms a circle. The inner diameter of these circles is somewhat smaller than the diameter of the ball $h$, and the two rows of balls $f^1$ are disposed at opposite sides of the diameter of the ball $h$, so that in every position one row of balls $f^1$ engages the one half of the ball $h$ and the other row of balls $f^1$ the other half of the ball $h$.

Dust entering with the air into the instrument casing through the openings $k^2$ will have a tendency to be deposited in the passage $k^1$, so that it is desirable to allow only air to pass in which is as clean as possible.

It will be understood that no restriction is made to the specific construction shown, which is merely illustrative of one embodiment of the invention, and it will be obvious that various modifications are quite possible within the meaning of the annexed claims without departing from the spirit of the invention.

What I claim as new and desire to secure by Letters Patent is:

1. In a gyroscopic inclinometer, a casing having a spherical chamber therein, a gyrorotor in the form of a globose zone, a globular bearing member, a rod extended axially through said bearing member and situated in the vertical axis of the casing chamber, sleeves on said rod spacing and maintaining said globular member with its center coincident with the center of the casing chamber, and the gyrorotor mounted on said globular member with its mass center coincident with the center of said globular member to rotate about its axis and permit of universal tilting movement of the casing independent of and relative to the axis of the gyrorotor.

2. In a gyroscopic inclinometer, a casing having a chamber therein and adapted for mounting in a fixed position, a globular member fixedly mounted in the casing, a gyrorotor in the form of a globose zone having an opening axially therethrough and vanes circumferentially disposed about and extending in meridian lines from end to end thereof, a ball bearing fitted in the gyrorotor opening arranged to mount the gyrorotor on the globular member with its mass center coincident with the center of and to rotate about its axis on the globular member, and permit universal tilting of the casing relative to the gyrorotor, said ball bearing comprising a ring fixed in the axial opening in the gyrorotor and two series of balls rotatting in parallel spaced raceways in the ring arranged whereby the inner diameter of the circle inscribed by each series of balls is of smaller diameter than the diameter of the globular member at one side of the diameter thereof, and the other series of balls contacting with the globular member at the side of the diameter thereof opposite the first series of balls.

3. In a gyroscopic inclinometer, a casing having a spherical chamber therein and adapted for mounting in fixed position, a globular member fixedly mounted in the casing with its center coincident with the center of the casing chamber, a gyrorotor in the form of a globose zone of a diameter slightly less than the diameter of the casing chamber and having an axial opening and ribs circumferentially disposed about the periphery and extending in meridian lines from end to end of the gyrorotor, and an anti-friction bearing fitted in the opening of the gyrorotor to mount the gyrorotor on the globular member with its mass center coincident with that of the globular member and to rotate about its axis on said globular member and permit universal tilting of the casing relative to the gyrorotor, said casing adapted for connection to means to exhaust air from the casing chamber and having openings through the wall thereof disposed in the equatorial plane of the casing for the entrance of air to the casing chamber, said openings inclining in the plane of rotation of the gyrorotor to form substantially tangential jets to impinge against the ribs of the gyrorotor and effect rotation thereof in one direction.

4. In a gyroscopic inclinometer, a casing adapted for fixedly mounting on a support and embodying a pair of sections arranged when united to form a spherical chamber therein, one section of the casing being of transparent material and having indicator lines thereon extended along the equator and a meridian line of the casing, a globular bearing member fixedly mounted in and with its center coincident with the center of the casing chamber, a gyrorotor in the form of a globose zone of a diameter slightly less than the diameter of the casing and having an indicator line about its equator, an anti-friction bearing member arranged co-axially of and to mount the gyrorotor on the bearing member in the casing with its mass center coincident with the center of said bearing member, whereby the gyrorotor is mounted on said bearing member for spinning to permit the casing to be universally tilted on horizontal axes relative to the gyrorotor and variably position the indicator lines thereon relative to the indicator line on the gyrorotor, and the position of said line adapted to be observed through the transparent casing section, and means to rotate the gyrorotor.

5. In a gyroscopic inclinometer, a casing having a chamber therein and adapted to be mounted in fixed position, a globular bearing member fixedly mounted in the casing chamber, and a gyrorotor in the form of a globose zone mounted on the globular member with its mass center coincident with the center of said globular member, whereby the gyrorotor is mounted on said member for spinning and to permit the casing to be universally tilted relative to the gyrorotor.

AUGUST HOFFMANN.